US012803070B2

(12) United States Patent
Yang et al.

(10) Patent No.: US 12,803,070 B2
(45) Date of Patent: Nov. 17, 2026

(54) METHOD, APPARATUS, DEVICE, AND MEDIUM FOR DETECTING QUALIFIED RATE OF BATTERY ELECTRODE SHEET

(71) Applicant: CONTEMPORARY AMPEREX TECHNOLOGY (HONG KONG) LIMITED, Hong Kong (CN)

(72) Inventors: Di Yang, Ningde (CN); Lei Song, Ningde (CN); Shengdong Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 703 days.

(21) Appl. No.: 18/346,816

(22) Filed: Jul. 4, 2023

(65) Prior Publication Data

US 2024/0222724 A1 Jul. 4, 2024

Related U.S. Application Data

(63) Continuation of application No. PCT/CN2023/081863, filed on Mar. 16, 2023.

(30) Foreign Application Priority Data

Jan. 4, 2023 (CN) ......................... 202310007535.0

(51) Int. Cl.
*H01M 10/48* (2006.01)
*H01M 10/0525* (2010.01)

(52) U.S. Cl.
CPC ....... *H01M 10/48* (2013.01); *H01M 10/0525* (2013.01)

(58) Field of Classification Search
None
See application file for complete search history.

(56) References Cited

U.S. PATENT DOCUMENTS

2019/0140253 A1 5/2019 Son et al.
2023/0127402 A1* 4/2023 Lee ...................... G01N 21/293 356/402
2024/0116011 A1* 4/2024 Kim ...................... B01F 23/565

FOREIGN PATENT DOCUMENTS

CN 102095831 A 6/2011
CN 102945753 A 2/2013
CN 105301081 A 2/2016
(Continued)

OTHER PUBLICATIONS

The European Patent Office (EPO) The Extended European Search Report for Application No. 23731078.4 Mar. 20, 2025 10 Pages.
(Continued)

*Primary Examiner* — Alix E Eggerding
(74) *Attorney, Agent, or Firm* — ANOVA LAW GROUP, PLLC

(57) ABSTRACT

A method for detecting a qualified rate of a battery electrode sheet includes collecting a first weight corresponding to a to-be-detected electrode sheet, drying the to-be-detected electrode sheet in a drying apparatus for a preset duration and collecting a second weight corresponding to the dried to-be-detected electrode sheet, and determining a detection result of the to-be-detected electrode sheet based on a ratio of a drying difference to the second weight. The drying difference is a difference between the first weight and the second weight.

12 Claims, 6 Drawing Sheets

(56) References Cited

FOREIGN PATENT DOCUMENTS

| | | | |
|---|---|---|---|
| CN | 206020277 | U | 3/2017 |
| CN | 108287171 | A | 7/2018 |
| EP | 4083608 | A1 | 11/2022 |
| EP | 4084112 | A1 | 11/2022 |
| WO | 2021251641 | A1 | 12/2021 |

OTHER PUBLICATIONS

The World Intellectual Property Organization (Wipo) International Search Report for PCT/CN2023/081863 Sep. 12, 2023 5 Pages (including translation).

* cited by examiner

METHOD, APPARATUS, DEVICE, AND MEDIUM FOR DETECTING QUALIFIED RATE OF BATTERY ELECTRODE SHEET

CROSS-REFERENCE TO RELATED APPLICATIONS

The present application is a continuation of International Application No. PCT/CN2023/081863, filed on Mar. 16, 2023, which claims priority to Chinese Patent Application No. 202310007535.0 filed on 4 Jan. 2023 and titled "METHOD, APPARATUS, DEVICE, AND MEDIUM FOR DETECTING QUALIFIED RATE OF BATTERY ELECTRODE SHEET", the entire contents of which are incorporated herein by reference.

TECHNICAL FIELD

The present application relates to battery management technologies, and in particular to, a method, an apparatus, a device, and a medium for detecting a qualified rate of a battery electrode sheet.

BACKGROUND

With the development of science and technology, more and more electrical apparatuses will carry batteries to implement their operation functions.

For example, lithium batteries not only bring people convenience and clean energy, but also cause huge potential safety hazard. For example, explosion of the lithium batteries has severe consequences. Therefore, quality of the lithium batteries has become a top priority, and on-line inspection has also become needed for each process in the production of the lithium batteries. Wherein, an electrode sheet is an important constituent part in a structure of the lithium batteries. For example, if unreasonable coating occurs in a process of coating the electrode sheet, abnormal moisture comprised in the electrode sheet will be caused, and lithium plating and an abnormal formation curve will also be caused in an initial test of a lithium-ion battery, thereby resulting in a great potential safety hazard on the battery, and seriously affecting safe use of the battery.

Therefore, how to detect a qualified rate of the electrode sheet has become a problem to be solved by those skilled in the art.

SUMMARY

Examples of the present application provide a method, an apparatus, a device, and a medium for detecting a qualified rate of a battery electrode sheet, thereby solving a problem that a potential safety hazard tends to exist because of failure to detect the qualified rate of the battery electrode sheet in a related art.

According to one aspect of examples of the present application, a method for detecting a qualified rate of a battery electrode sheet is provided, comprising:

collecting a first weight corresponding to a to-be-detected electrode sheet; drying the to-be-detected electrode sheet in a drying apparatus for a preset duration to collect a second weight corresponding to the dried to-be-detected electrode sheet; and determining a detection result of the to-be-detected electrode sheet based on a ratio of a drying difference to the second weight, where the drying difference is a difference between the first weight and the second weight. The technical solutions of the examples of the present application are applied to compare a moisture value comprised in the electrode sheet obtained by drying with its dead weight, and determine a reasonable coating degree of each electrode sheet according to a weight ratio of the moisture value in each electrode sheet in a targeted manner, thereby avoiding a disadvantage of an abnormal moisture content of the electrode sheet caused by unreasonable coating in a process of coating the electrode sheet in a related art.

Optionally, in another example based on the above method of the present application, before drying the to-be-detected electrode sheet in the drying apparatus for the preset duration, the method further comprises: acquiring a preset drying time association table; and selecting the preset duration matching the first weight based on the drying time association table; or determining the number of to-be-detected electrode sheets, and selecting the preset duration matching the number based on the drying time association table. The technical solutions of the examples of the present application are applied to select reasonable drying durations for different weights or different numbers of electrode sheets according to preset association information in a targeted manner, thereby ensuring that moisture comprised in the electrode sheet is completely dried, and then achieving the purpose of subsequently determining the reasonable coating degree of each electrode sheet according to the weight ratio of the moisture value in each electrode sheet in a targeted manner.

Optionally, in another example based on the above method of the present application, the determining the detection result of the to-be-detected electrode sheet based on the ratio of the drying difference to the second weight comprises: determining a material attribute of the to-be-detected electrode sheet, and selecting a preset ratio range matching the material attribute; and determining the detection result of the to-be-detected electrode sheet based on a size relationship between the ratio of the drying difference to the second weight and the preset ratio range. The technical solutions of the examples of the present application are applied to select reasonable ratios for electrode sheets with different material attributes according to the preset association information in a targeted manner, thereby achieving the purpose of subsequently determining the reasonable coating degree of each electrode sheet according to the weight ratio of the moisture value in each electrode sheet in a targeted manner.

Optionally, in another example based on the above method of the present application, the determining the material attribute of the to-be-detected electrode sheet, and selecting the preset ratio range matching the material attribute comprise: determining historical storage information of the to-be-detected electrode sheet, wherein the historical storage information comprises a historical storage environment and a historical storage duration; and selecting the preset ratio range matching the material attribute based on the historical storage information. The technical solutions of the examples of the present application are applied to select reasonable ratios for electrode sheets with different material attributes in different storage environments for different storage durations according to the preset association information in a targeted manner, thereby avoiding failure to accurately ascertain a reasonable degree of reasonable coating of the electrode sheet due to unreasonable selection of the ratio.

Optionally, in another example based on the above method of the present application, after the selecting the preset ratio range matching the material attribute, the method further comprises: determining that the detection result of the to-be-detected electrode sheet is qualified when detecting that the ratio of the drying difference to the second weight is within the preset ratio range; and determining that the detection result of the to-be-detected electrode sheet is unqualified when detecting that the ratio of the drying difference to the second weight is beyond the preset ratio range. The technical solutions of the examples of the present application are applied to compare the moisture value comprised in the electrode sheet obtained by drying with its dead weight, and conclude that the detection result is unqualified only when determining that a ratio of the moisture value to a total weight of each electrode sheet is small, thereby not only avoiding a disadvantage of a high moisture content of the electrode sheet caused by too heavy coating in the process of coating the electrode sheet in a related art, but also avoiding a problem of affecting the battery performance due to too little coating in the process of coating the electrode sheet.

Optionally, in another example based on the above method of the present application, after collecting the first weight corresponding to the to-be-detected electrode sheet, the method further comprises: determining whether the first weight corresponding to the to-be-detected electrode sheet is within a preset weight range; and drying the to-be-detected electrode sheet in the drying apparatus for the preset duration when the first weight corresponding to the to-be-detected electrode sheet is within the preset weight range. The technical solutions of the examples of the present application are applied to first detect a own weight of the electrode sheet before detecting the moisture content of the electrode sheet, preliminarily ascertain that the coating degree of the electrode sheet is reasonable only when the electrode sheet is determined to be within the preset weight range, and subsequently start a step of detecting the moisture content of the electrode sheet.

Optionally, in another example based on the above method of the present application, before the collecting the first weight corresponding to the to-be-detected electrode sheet, the method further comprises: acquiring an electrode sheet image corresponding to the to-be-detected electrode sheet, and inputting the electrode sheet image into an image detection model; recognizing a color feature and a brightness feature corresponding to the electrode sheet image using the image detection model; and drying the to-be-detected electrode sheet in the drying apparatus for the preset duration when detecting that the color feature and the brightness feature satisfy a preset condition. The technical solutions of the examples of the present application are applied to first detect a color and a brightness of the electrode sheet image before detecting the moisture content of the electrode sheet, and preliminarily ascertain whether the coating degree of the electrode sheet is reasonable by comparing the color and the brightness with the preset condition, thus determining whether to subsequently start the step of detecting the moisture content of the electrode sheet.

Optionally, in another example based on the above method of the present application, after the determining the detection result of the to-be-detected electrode sheet based on the ratio of the drying difference to the second weight, the method further comprises: establishing a mapping relationship between the to-be-detected electrode sheet, the corresponding detection result, and a corresponding separator identifier; and storing the mapping relationship in a preset storage area; and receiving a collection instruction sent from a battery detection system, extracting the mapping relationship from the storage area, and sending the mapping relationship to the battery detection system. The technical solutions of the examples of the present application are applied to automatically store a relationship between a detection result of each electrode sheet and a separator of the electrode sheet, to facilitate subsequent retrieval at any moment when query is required.

According to another aspect of examples of the present application, an apparatus for detecting a qualified rate of a battery electrode sheet is provided, comprising: a collection module configured to collect a first weight corresponding to a to-be-detected electrode sheet; a processing module configured to dry the to-be-detected electrode sheet in a drying apparatus for a preset duration to collect a second weight corresponding to the dried to-be-detected electrode sheet; and a determination module configured to determine a detection result of the to-be-detected electrode sheet based on a ratio of a drying difference to the second weight, where the drying difference is a difference between the first weight and the second weight. The technical solutions of the examples of the present application are applied to compare a moisture value comprised in the electrode sheet obtained by drying with its dead weight, and determine a reasonable coating degree of each electrode sheet according to a weight ratio of the moisture value in each electrode sheet in a targeted manner, thereby avoiding a disadvantage of an abnormal moisture content of the electrode sheet caused by unreasonable coating in a process of coating the electrode sheet in a related art.

According to still another aspect of examples of the present application, an electronic device is provided, comprising:

- a memory configured to store executable instructions; and
- a processor configured to execute the executable instructions with the memory to complete operations of the method for detecting a qualified rate of a battery electrode sheet according to any one of the above descriptions.

According to yet another aspect of examples of the present application, a computer-readable storage medium is provided. The computer-readable storage medium is configured to store computer-readable instructions, where the instructions, when executed, execute operations of the method for detecting a qualified rate of a battery electrode sheet according to any one of the above descriptions.

The above description merely provides an overview of the technical solutions of the present application. In order to more clearly understand the technical means of the present application, the present application may be implemented according to the content of the specification, and in order to make the above and other objectives, features, and advantages of the present application more obvious and understandable, specific embodiments of the present application are listed below.

DESCRIPTION OF DRAWINGS

By reading the detailed description of the embodiments below, various other advantages and benefits will become apparent to those of ordinary skills in the art. The drawings are merely used to show some embodiments, and are not considered to impose any limitation on the present application. Moreover, in all of the drawings, the same parts are represented by the same reference numerals. In the figures.

DETAILED DESCRIPTION

Figure 1A:
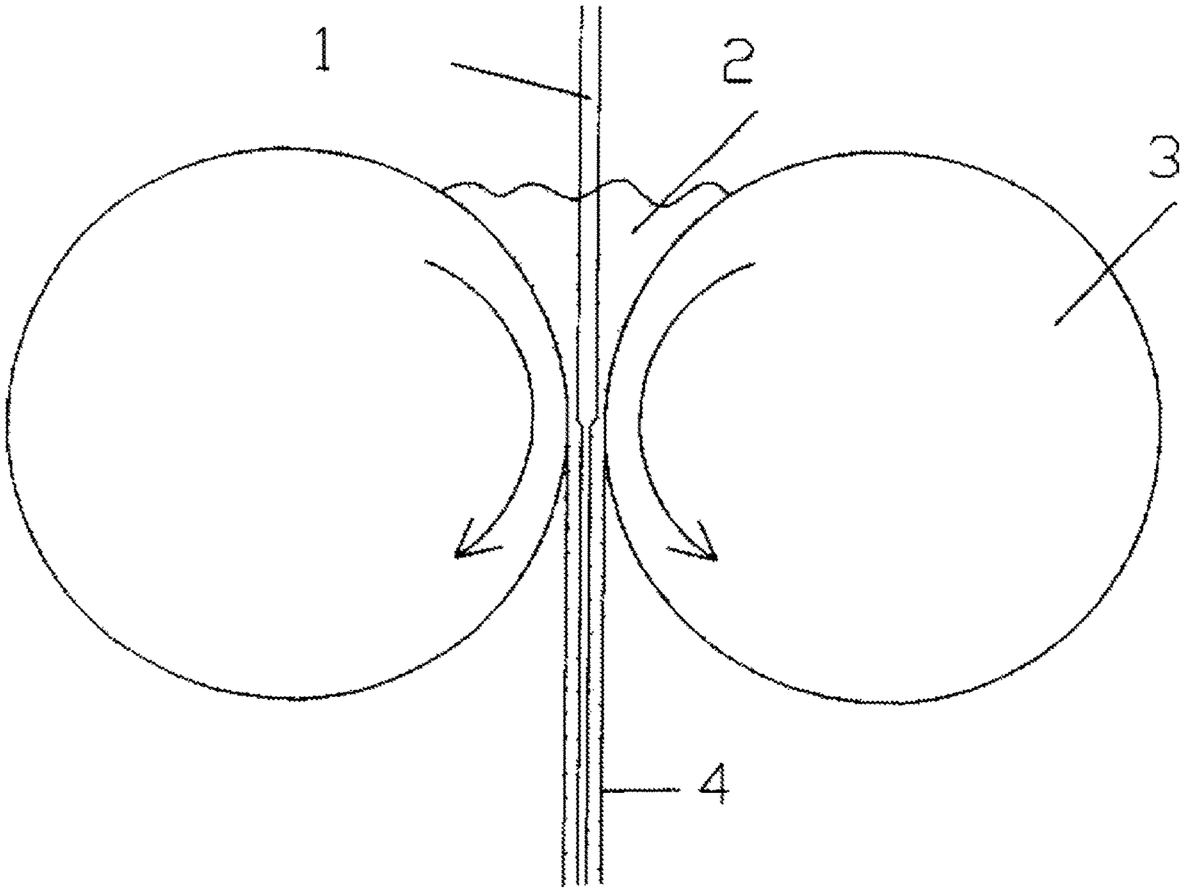
FIG. 1*a* is a schematic diagram of an electrode sheet coating process presented in the present application.

Now, exemplary examples of the present application will be described in detail with reference to the accompanying drawings. It should be noted that: unless otherwise specified, relative arrangement, digital expressions, and values of the components and steps described in these examples do not limit the scope of the present application.

Further, it should be understood that, for ease of description, dimensions of various parts shown in the drawings are not drawn according to actual proportional relations.

The following description of at least one exemplary example is in fact merely illustrative, and does not serve as any limitation to the present application and its application or use.

The techniques, methods and devices known to those of ordinary skills in the relevant art may not be discussed in detail, but where appropriate, the techniques, methods and devices shall be considered as a part of the specification.

It should be noted that: similar reference numerals and letters represent similar items in the following figures, so that once an item is defined in a figure, it will not be further discussed in subsequent figures.

In addition, the technical solutions among the examples of the present application may be combined with each other, provided that the combination of the technical solutions can be implemented by those of ordinary skills in the art. When the combination of the technical solutions is contradictory or cannot be implemented, the combination of the technical solutions should be considered absent, and is not encompassed within the scope of protection claimed in the present application.

It should be noted that all directional indications (such as up, low, left, right, front, behind, . . . ) in the examples of the present application are only used to explain a relative position relationship, movement, etc. among components under a particular pose (as shown in the figures), and will change accordingly if the particular pose changes.

The method for detecting a qualified rate of a battery electrode sheet according to exemplary embodiments of the present application will be described below with reference to FIG. 1-FIG. 3. It should be noted that the following application scenarios are shown only for the purpose of understanding of the spirit and principle of the present application, and do not impose any limitation on the embodiments of the present application in this aspect. On the contrary, the embodiments of the present application may be applied to any applicable scenario.

In related technologies, with the rapid development of lithium-battery technologies, lithium batteries are gradually widely applied to new-energy vehicles.

The lithium batteries not only bring people convenience and clean energy, but also cause huge potential safety hazard. Explosion of the lithium batteries has severe consequences. Therefore, quality of the lithium batteries has become a top priority, and on-line inspection has also become needed for each process in the production of the lithium batteries. An electrode sheet is an important constituent part in a structure of the lithium batteries. For example, if unreasonable coating occurs in a process of coating the electrode sheet, abnormal moisture comprised in the electrode sheet will be caused, and lithium plating and an abnormal formation curve will also be caused in an initial test of a lithium-ion battery, thereby resulting in a great potential safety hazard on the battery, and seriously affecting safe use of the battery.

As an example, preparation of the electrode sheet of the lithium batteries is described in the present application:

An internal structure of the lithium batteries comprises a battery shell, an electrode, a separator, an electrolyte solution, and a sealing material; and an internal structure of an electrode assembly of the batteries comprises three layers: a positive electrode sheet, a negative electrode sheet, and a separator therebetween. In an implementation of an example of the present application, the electrode assembly may be inserted into a nickel-coated steel shell in such a way that a negative tab of the electrode assembly contacts with the bottom of the battery shell, the positive electrode sheet can contact with a battery cover through a positive tab; and a seal ring of an insulating polymer material is inserted between an upper cover and a case to form a battery cell after sealing.

As an example, an appropriate additive may be added into an electrode sheet material, and is generally selected from the following metals, comprising niobium, cobalt, cadmium, molybdenum, tin, lead, lithium, sodium, potassium, magnesium, aluminum, calcium, zinc, zirconium, and titanium, and copper oxides. It is mainly intended to avoid a high voltage phenomenon of the battery on commencement of discharge, and effectively reduce a phenomenon of battery expansion of the lithium batteries after discharge.

As another example, an aluminum mesh has a thickness from 0.30 to 0.45 mm, a diamond-shaped mesh aperture, and an aperture size of (1.2–2.0)×(2.0–2.5) mm.

In an implementation, two coating methods below are available for the electrode sheet:

One of the coating methods is slurrying method: as shown in FIG. 1*a*, heat treated pyrite, compressed acetylene black, graphite, and an additive are fully mixed to form sufficiently mixed powder, which is poured into a mixer, and may be heated by steam heating or water bath heating or electric heating in a dividing wall of the mixer with a heating temperature controlled at 40-90° C. Deionized water and industrial alcohol are successively added, and the mixture is stirred for 20-70 min. Then, a polytetrafluoroethylene emulsion is added, and the mixture is quickly stirred to form an ointment 2. The sufficiently mixed ointment is applied on the aluminum mesh 1, compressed into a sheet using a twin-roller machine 3, and then dried through a tunnel furnace at 180-200° C. or dried by other methods. Then, the dried ointment is repeatedly rolled using a roller machine to form a powder sheet 4 with a certain thickness, which may be controlled at 0.3-0.55 mm, and, in some embodiments, is controlled at 0.4-0.45 mm.

Figure 1B:
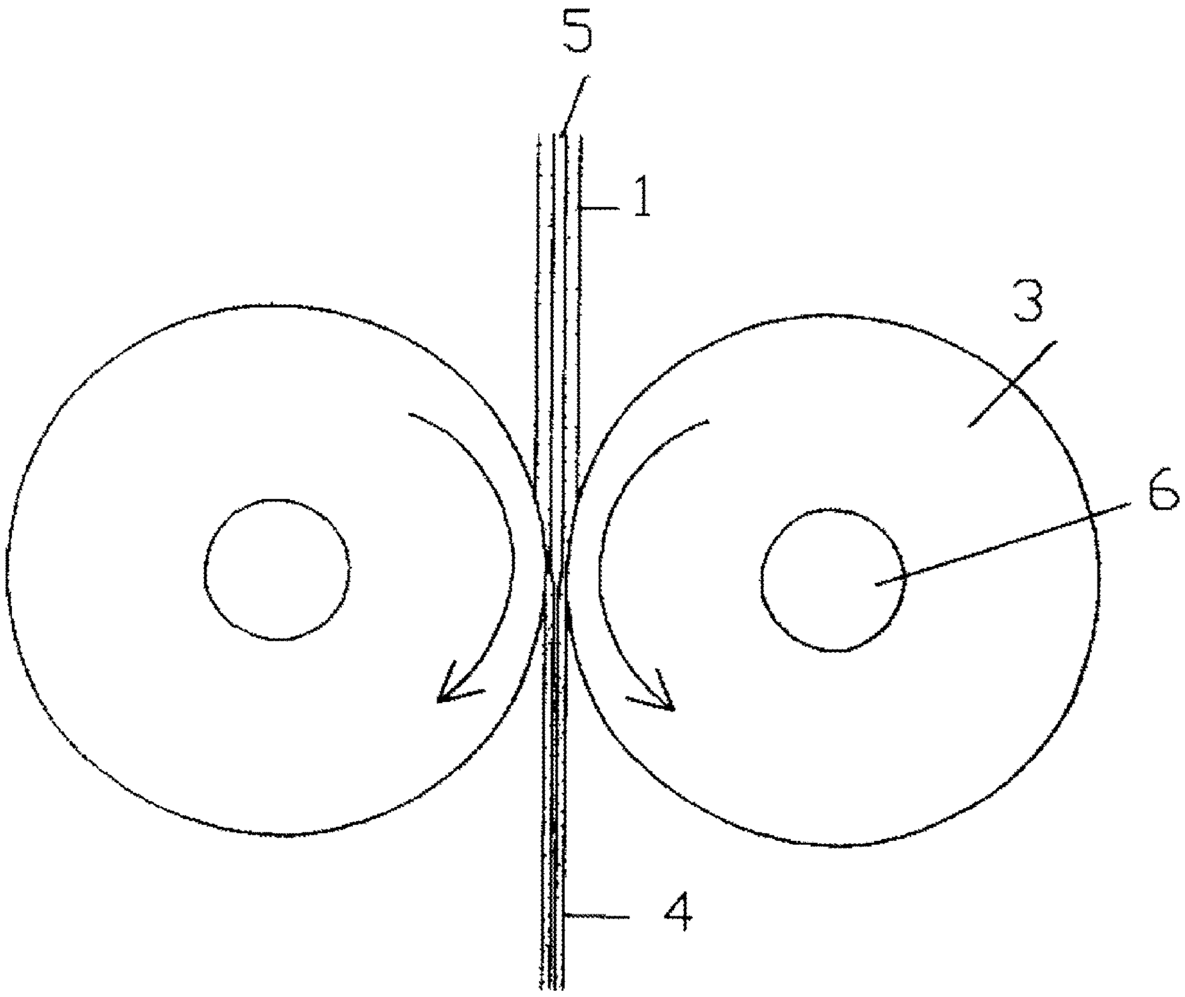
FIG. 1*b* is a schematic diagram of another electrode sheet coating process presented in the present application.

The other coating method is film rolling: as shown in FIG. 1*b*, heat treated pyrite, compressed acetylene black, graphite, and additive are sufficiently mixed, then industrial alcohol and a polytetrafluoroethylene emulsion are added, then the polytetrafluoroehylene emulsion is sufficiently dispersed, then deionized water is added, and the mixture is stirred to form an ointment. The resulting ointment is rolled using a twin-roller machine equipped with a heating apparatus 6 to form a film 5 with a film thickness of 0.2-0.3 mm. The film 5 is baked in a high-temperature oven at 100-180° C. for 6-12 h, to remove moisture. Then, the film 5 and the aluminum mesh 1 are repeatedly rolled using the roller machine 3 to form a uniform and compact positive electrode powder sheet 4, of which a thickness may be controlled at 0.3-0.55 mm, and, in some embodiments, is controlled at 0.4-0.45 mm.

Further, in an example of the present application, the rolled positive electrode powder sheet and negative electrode powder sheet may be cut into a positive electrode sheet of a certain size, which is dried by atmospheric blast heating and vacuum heating. A positive electrode sheet and a negative electrode sheet for winding may be obtained.

Further, the unreasonable coating in the process of coating the electrode sheet is described:

The lithium-ion battery serves as a very typical non-aqueous secondary battery, water absorption performance of its raw materials has great influence on performances of the lithium-ion battery, such as capacity functioning and circulation, where if moisture of the electrode sheet is too high, lithium plating and an abnormal formation curve will be caused in an initial test of the lithium-ion battery, thereby resulting in a great potential safety hazard on the battery, and seriously affecting safe use of the battery.

In addition, if the moisture of the electrode sheet is too low, capacity, internal resistance, and cycle life of the battery will be affected, thereby damaging the battery performance, and solving a problem that a potential safety hazard tends to exist because of failure to detect a qualification degree of the coating of the battery electrode sheet.

The present application provides a method for detecting a qualified rate of a battery electrode sheet. The concept of the present application is to compare a moisture value comprised in the electrode sheet obtained by drying with its dead weight, and determine a reasonable coating degree of each electrode sheet according to a weight ratio of the moisture value in each electrode sheet in a targeted manner, thereby avoiding a disadvantage of an abnormal moisture content of the electrode sheet caused by unreasonable coating in a process of coating the electrode sheet in a related art.

An implementation of the present application further provides a method, an apparatus, a device, and a medium for detecting a qualified rate of a battery electrode sheet.

Figure 2:
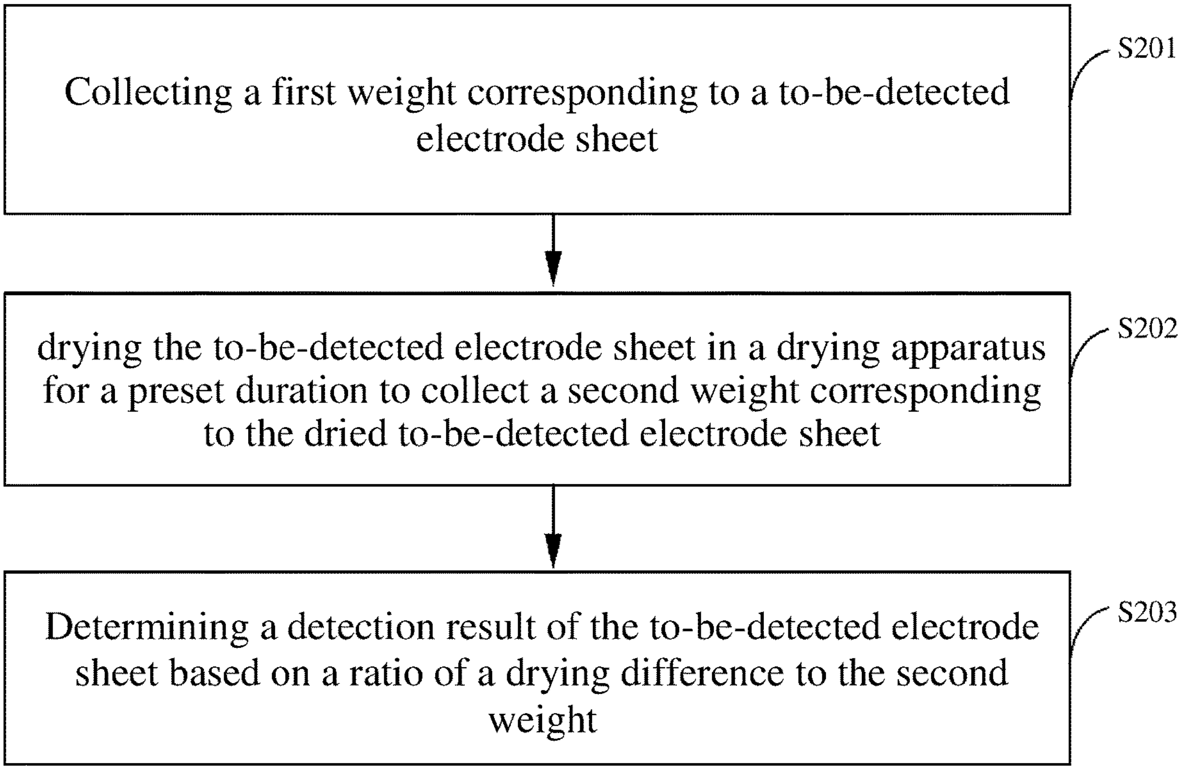
FIG. 2 is a schematic diagram of a method for detecting a qualified rate of a battery electrode sheet presented in the present application.
Figure 3:
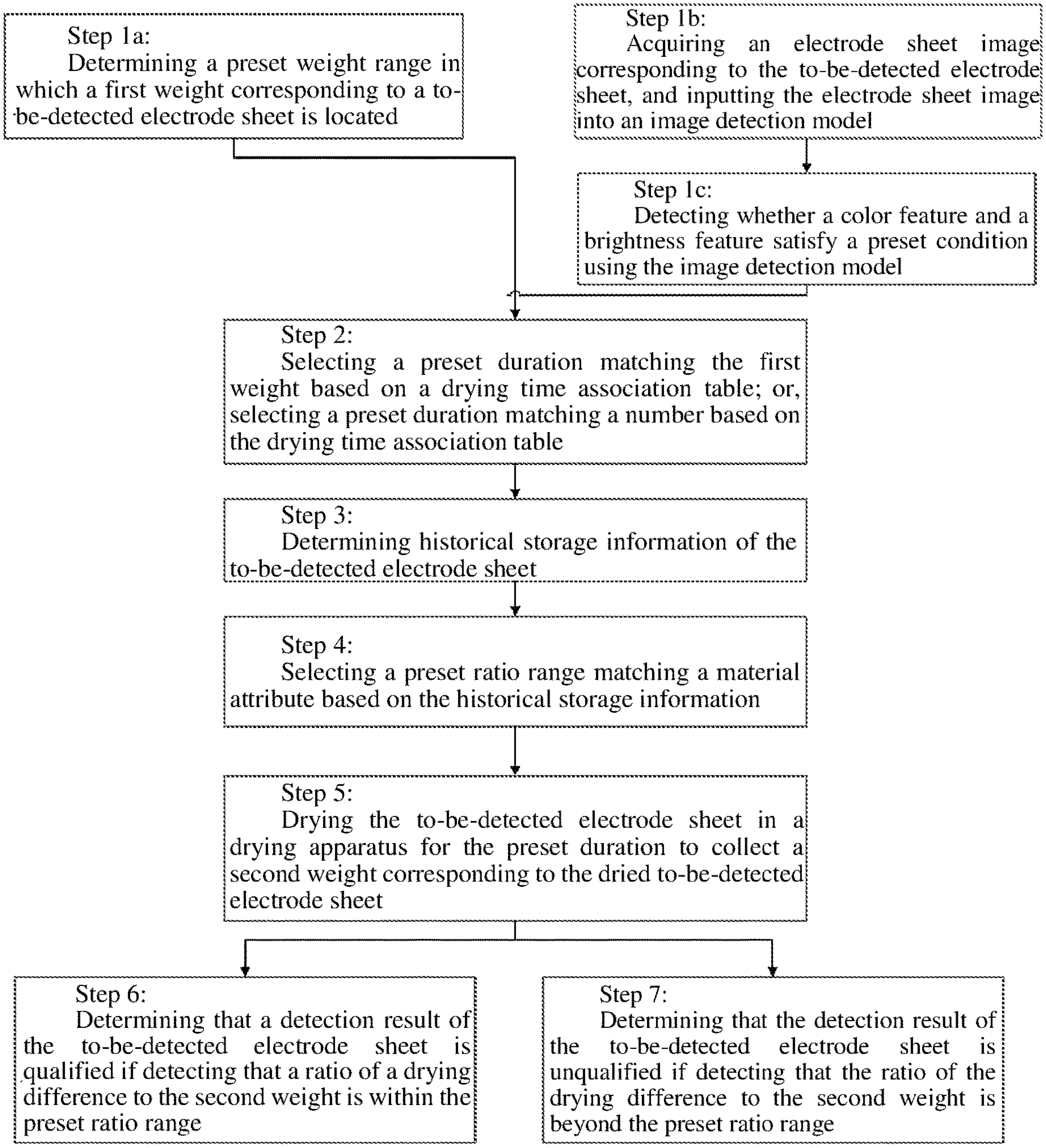
FIG. 3 is a schematic flowchart of a method for detecting a qualified rate of a battery electrode sheet presented in the present application.

FIG. 2 schematically shows a schematic flowchart of a method for detecting a qualified rate of a battery electrode sheet according to an embodiment of the present application.

As shown in FIG. 2, the method comprises:

S201: collecting a first weight corresponding to a to-be-detected electrode sheet.

In the present application, the to-be-detected electrode sheet is not specifically defined, for example, may be a positive electrode sheet, or may be a negative electrode sheet.

In an implementation, the number of to-be-detected electrode sheets may be one or a plural number. The first weight is a weight of the to-be-detected electrode sheet before drying.

S202: drying the to-be-detected electrode sheet in a drying apparatus for a preset duration to collect a second weight corresponding to the dried to-be-detected electrode sheet.

In an implementation, the drying apparatus is, e.g., a moisture meter, and in an example of the present application, one or more to-be-detected electrode sheets may be put into the moisture meter to start drying by starting the moisture meter.

Further, after startup, the moisture meter runs for running time set as 10 min (i.e., the preset duration), and after reaching the set running time for drying, the moisture meter can output data information, such as weight 10 g before weighing (i.e., the first weight), weight 5 g after weighing (the second weight), and the drying duration, for subsequent detection for qualification of the to-be-detected electrode sheet.

It should be noted that when there is a plurality of to-be-detected electrode sheets, both the weight before weighing and the weight after weighing obtained by the drying apparatus are total weights.

S203: determining a detection result of the to-be-detected electrode sheet based on a ratio of a drying difference to the second weight, where the drying difference is a difference between the first weight and the second weight.

It is understandable that, when a coating degree of an electrode sheet is unreasonable, no matter too heavy coating or too little coating will affect the qualified rate of the battery. Based on this, in the present application, a ratio of a moisture content of an electrode sheet to its own weight may be detected to infer whether there is too heavy coating or too little coating in a process of coating the electrode sheet.

Specifically, after the moisture value (i.e., the drying difference) of the to-be-detected electrode sheet is obtained in an example of present application, it is needed to compare the moisture value with a own weight of the to-be-detected electrode sheet in the present application. That is, only when a ratio of the moisture value of the electrode sheet to its own weight is determined to be within a reasonable region (i.e., the preset ratio range), will the moisture content of the electrode sheet be ascertained to be reasonable. Then, a detection result that the coating degree of the electrode sheet is reasonable is obtained.

To sum up, the technical solutions of the examples of the present application include: collecting a first weight corresponding to a to-be-detected electrode sheet; drying the to-be-detected electrode sheet in a drying apparatus for a preset duration to collect a second weight corresponding to the dried to-be-detected electrode sheet; and determining a detection result of the to-be-detected electrode sheet based on a ratio of a drying difference to the second weight, where the drying difference is a difference between the first weight and the second weight.

The technical solutions of the examples of the present application are applied to compare a moisture value comprised in the electrode sheet obtained by drying with its dead weight, and determine a reasonable coating degree of each electrode sheet according to a weight ratio of the moisture value in each electrode sheet in a targeted manner, thereby avoiding a disadvantage of an abnormal moisture content of the electrode sheet caused by unreasonable coating in a process of coating the electrode sheet in a related art.

Optionally, in another example based on the above method of the present application, before drying the to-be-detected electrode sheet in the drying apparatus for the preset duration, the method further comprises: acquiring a preset drying time association table; and selecting the preset duration matching the first weight based on the drying time association table; or determining the number of to-be-detected electrode sheets, and selecting the preset duration matching the number based on the drying time association table.

In an implementation of the present application, in order to ensure a sufficient drying degree of the to-be-detected electrode sheet, it is needed to select a reasonable drying duration for the to-be-detected electrode sheet according to relevant attributes of the to-be-detected electrode sheet.

As an example, for example, when the to-be-detected electrode sheet is heavy, it means that the to-be-detected electrode sheet may comprise much moisture, so that a long drying duration may be selected for the to-be-detected electrode sheet. As another example, for example, when the number of to-be-detected electrode sheets is large, it means that a degree of to-be-dried moisture is high, so that a long drying duration may be selected for the to-be-detected electrode sheet.

The technical solutions of the examples of the present application are applied to select reasonable drying durations for different weights or different numbers of electrode sheets according to preset association information in a targeted manner, thereby ensuring that moisture comprised in the electrode sheet is completely dried, and then achieving the purpose of subsequently determining the reasonable coating degree of each electrode sheet according to the weight ratio of the moisture value in each electrode sheet in a targeted manner.

Optionally, in another example based on the above method of the present application, the determining the detection result of the to-be-detected electrode sheet based on the ratio of the drying difference to the second weight comprises: determining a material attribute of the to-be-detected electrode sheet, and selecting a preset ratio range matching the material attribute; and determining the detection result of the to-be-detected electrode sheet based on a size relationship between the ratio of the drying difference to the second weight and the preset ratio range.

Further, the selection of the preset ratio range is crucial for the detection result of the electrode sheet. It is understandable that electrode sheets with different material attributes may present different corresponding performances, and therefore, various types of electrode sheets have different reasonable moisture contents accordingly, thereby avoiding a disadvantage of failure to determine whether coating degrees of the electrode sheets with different material attributes are reasonable in a targeted manner due to setting of a unified preset ratio range. In an example of the present application, it is needed to select a preset ratio range matching an electrode sheet with each material attribute.

As an example, for example, in an example of the present application, a preset ratio range of 5%-8% may be selected for an electrode sheet with graphite material attributes. In an example of the present application, a preset ratio range of 3%-5% may be selected for an electrode sheet with cobalt material attributes.

The technical solutions of the examples of the present application are applied to select reasonable ratios for electrode sheets with different material attributes according to the preset association information in a targeted manner, thereby achieving the purpose of subsequently determining the reasonable coating degree of each electrode sheet according to the weight ratio of the moisture value in each electrode sheet in a targeted manner.

Optionally, in another example based on the above method of the present application, the determining the material attribute of the to-be-detected electrode sheet, and selecting the preset ratio range matching the material attribute comprise: determining historical storage information of the to-be-detected electrode sheet, wherein the historical storage information comprises a historical storage environment and a historical storage duration; and selecting the preset ratio range matching the material attribute based on the historical storage information.

Similarly, in order to ensure reasonable selection of the preset ratio range, in an example of the present application, it is further needed to ascertain the historical storage information of the battery electrode sheet. It is understandable that, for a same electrode sheet, both different storage environments (such as storage in a wet, shady, and cool environment and storage in a warm and dry environment) and different historical storage durations will affect the moisture comprised in the electrode sheet, thereby avoiding a disadvantage of failure to determine whether coating degrees of the electrode sheet in different storage states are reasonable in a targeted manner due to setting of a unified preset ratio range. In an example of the present application, it is needed to select the preset ratio range matching the historical storage environment and the historical storage duration of the electrode sheet with each material attribute.

In an implementation of the present application, a historical period of the historical storage information is not limited, for example, historical storage information in a historical week or historical storage information on a historical day, which is critical for the detection result of the electrode sheet. It is understandable that electrode sheets with different material attributes may present different corresponding performances, and therefore, various types of electrode sheets have different reasonable moisture contents accordingly, The technical solutions of the examples of the present application are applied to select reasonable ratios for electrode sheets with different material attributes in different storage environments for different storage durations according to the preset association information in a targeted manner, thereby avoiding failure to accurately ascertain a reasonable degree of reasonable coating of the electrode sheet due to unreasonable selection of the ratio.

Optionally, in another example based on the above method of the present application, after the selecting the preset ratio range matching the material attribute, the method further comprises: determining that the detection result of the to-be-detected electrode sheet is qualified when detecting that the ratio of the drying difference to the second weight is within the preset ratio range; and determining that the detection result of the to-be-detected electrode sheet is unqualified when detecting that the ratio of the drying difference to the second weight is beyond the preset ratio range.

It is understandable that, if the ratio of the moisture value of the electrode sheet to its dead weight is detected to be within a reasonable range (the preset ratio range), the coating degree of the electrode sheet is determined to be reasonable, and then the resulting detection result of the to-be-detected electrode sheet is a qualified result.

Further, if the ratio of the moisture value of the electrode sheet to its dead weight is detected to be higher than the reasonable range (the preset ratio range), the moisture value comprised in the electrode sheet is determined to be too high, then the coating degree of the electrode sheet is determined to be too heavy, and then the resulting detection result of the to-be-detected electrode sheet is an unqualified result.

In addition, if the ratio of the moisture value of the electrode sheet to its dead weight is detected to be lower than the reasonable range (the preset ratio range), the moisture value comprised in the electrode sheet is determined to be too low, then the coating degree of the electrode sheet is determined to be too light, and then the resulting detection result of the to-be-detected electrode sheet is an unqualified result.

The technical solutions of the examples of the present application are applied to compare the moisture value comprised in the electrode sheet obtained by drying with its dead weight, and conclude that the detection result is unqualified only when determining that a ratio of the moisture value to a total weight of each electrode sheet is small, thereby not only avoiding a disadvantage of a high moisture content of the electrode sheet caused by too heavy coating in the process of coating the electrode sheet in a related art, but also avoiding a problem of affecting the battery performance due to too little coating in the process of coating the electrode sheet.

Optionally, in another example based on the above method of the present application, after collecting the first weight corresponding to the to-be-detected electrode sheet, the method further comprises: determining whether the first weight corresponding to the to-be-detected electrode sheet is within a preset weight range; and drying the to-be-detected electrode sheet in the drying apparatus for the preset duration when the first weight corresponding to the to-be-detected electrode sheet is within the preset weight range.

In an implementation of the present application, the own weight of the electrode sheet may be first detected. It is understandable that, if the to-be-detected electrode sheet is detected to be too heavy or too light, a result that the coating degree of the electrode sheet is unreasonable can be obtained. Further, it is not necessary to start a subsequent step of detecting a moisture content.

In an implementation of an example of the present application, the first weight corresponding to the to-be-detected electrode sheet can be obtained using a weighing apparatus. As an example, for example, the weighing apparatus is an electronic scale.

In an implementation, the electronic scale is connected to a serial port of a computer by hardware connection through a RS-232C cable, serial communication parameters corresponding to serial port parameter configurations of the computer are manually set on the electronic scale, and the electronic scale establishes a serial communication connection with the computer through a windows function.

Whenever a to-be-weighed to-be-detected electrode sheet is placed, the electronic scale will automatically detect whether the weighing is stable, and after the weighing is stable, the electronic scale will automatically send weight data to the computer in a certain specification format. After detecting the data sent from the electronic scale, the computer automatically collects the data, analyzes the data, automatically collects the corresponding number of weighed electrode sheets according to process requirements for collection, and then uploads the weight data according to MES requirements.

The technical solutions of the examples of the present application are applied to first detect a own weight of the electrode sheet before detecting the moisture content of the electrode sheet, preliminarily ascertain that the coating degree of the electrode sheet is reasonable only when the electrode sheet is determined to be within the preset weight range, and subsequently start a step of detecting the moisture content of the electrode sheet.

Optionally, in another example based on the above method of the present application, after the determining the detection result of the to-be-detected electrode sheet based on the ratio of the drying difference to the second weight, the method further comprises: establishing a mapping relationship between the to-be-detected electrode sheet, the corresponding detection result, and a corresponding separator identifier; and storing the mapping relationship in a preset storage area; and receiving a collection instruction sent from a battery detection system, extracting the mapping relationship from the storage area, and sending the mapping relationship to the battery detection system. The technical solutions of the examples of the present application are applied to automatically store a relationship between a detection result of each electrode sheet and a separator of the electrode sheet, to facilitate subsequent retrieval at any moment when query is required.

Optionally, in another example based on the above method of the present application, before the collecting the first weight corresponding to the to-be-detected electrode sheet, the method further comprises: acquiring an electrode sheet image corresponding to the to-be-detected electrode sheet, and inputting the electrode sheet image into an image detection model; recognizing a color feature and a brightness feature corresponding to the electrode sheet image using the image detection model; and drying the to-be-detected electrode sheet in the drying apparatus for the preset duration when detecting that the color feature and the brightness feature satisfy a preset condition.

In an implementation of an example of the present application, the coating degree of the to-be-detected electrode sheet may be further preliminarily ascertained by image detection. It is understandable that both a color and a brightness on a surface of the electrode sheet will change after the electrode sheet is coated. Further, either too high or too low coating degree will cause the color and the brightness on the surface of the electrode sheet to be different from the color and the brightness on the surface of the electrode sheet when the coating degree is uniform and reasonable.

Based on this, an example of the present application can recognize whether the color feature corresponding to the electrode sheet image satisfies a certain color condition and whether the brightness feature satisfies a certain brightness condition (the color condition and the brightness condition are the preset condition) using the preset image detection model, thereby determining whether the coating degree of the electrode sheet is reasonable.

In an implementation of the present application, the image detection model is not specifically defined, for example, may be a convolutional neural network (CNN). The convolutional neural network is a category of feedforward neural network including convolutional computation and having a deep structure, and is one of the representative algorithms of deep learning. The convolutional neural network has a representation learning ability, and can perform translation-invariant classification on inputted information according to its hierarchical structure. Thanks to a powerful feature representation ability on images, the CNN (convolutional neural network) has achieved remarkable effects in the fields, such as image classification, target detection, and semantic segmentation.

Further, in the present application, the feature information (the color feature and the brightness feature) in the electrode sheet image may be detected using the CNN (convolutional neural network) model, thus realizing feature recognition on the electrode sheet image, and determining a reasonable coating degree of the electrode sheet. It is needed to input the electrode sheet image into a preset convolutional neural network model, and use an output from a last fully connected layer (FC layer) of the convolutional neural network model as a recognition result of feature data corresponding to the electrode sheet image.

The technical solutions of the examples of the present application are applied to first detect a color and a brightness of the electrode sheet image before detecting the moisture content of the electrode sheet, and preliminarily ascertain whether the coating degree of the electrode sheet is reasonable by comparing the color and the brightness with the preset condition, thus determining whether to subsequently start the step of detecting the moisture content of the electrode sheet.

As an example, the method for detecting a qualified rate of a battery electrode sheet presented in the present application is specifically described with reference to FIG. 3:

Step 1*a*: determining a preset weight range in which a first weight corresponding to a to-be-detected electrode sheet is located. Then, step 2 is entered.

Step 1*b*: acquiring an electrode sheet image corresponding to the to-be-detected electrode sheet, and inputting the electrode sheet image into an image detection model. Then, step 1*c* is entered.

Step 1*a* and step 1*b* may be executed in parallel or may be executed in sequence regardless of order.

Step 1*c*: detecting whether a color feature and a brightness feature satisfy a preset condition using the image detection model.

Step 2: selecting a preset duration matching the first weight based on a drying time association table; or selecting a preset duration matching a number based on the drying time association table.

Step 3: determining historical storage information of the to-be-detected electrode sheet.

The historical storage information includes a historical storage environment and a historical storage duration.

Step 4: selecting a preset ratio range matching a material attribute based on the historical storage information.

Step 5: drying the to-be-detected electrode sheet in a drying apparatus for the preset duration to collect a second weight corresponding to the dried to-be-detected electrode sheet. Then, step 6 or step 7 is entered.

Step 6: determining that a detection result of the to-be-detected electrode sheet is qualified when detecting that a ratio of a drying difference to the second weight is within the preset ratio range.

Step 7: determining that the detection result of the to-be-detected electrode sheet is unqualified when detecting that the ratio of the drying difference to the second weight is beyond the preset ratio range.

The technical solutions of the examples of the present application are applied to compare a moisture value comprised in the electrode sheet obtained by drying with its dead weight, and determine a reasonable coating degree of each electrode sheet according to a weight ratio of the moisture value in each electrode sheet in a targeted manner, thereby avoiding a disadvantage of an abnormal moisture content of the electrode sheet caused by unreasonable coating in a process of coating the electrode sheet in a related art.

Figure 4:
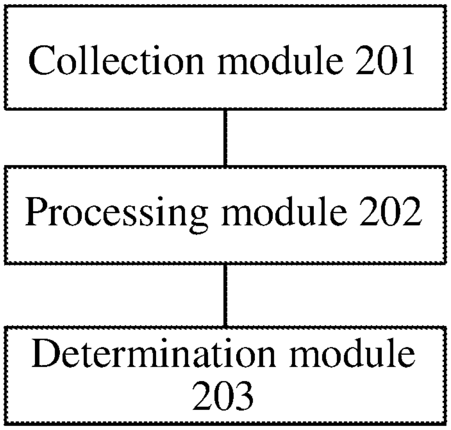
FIG. 4 is a schematic structural diagram of an electronic apparatus provided in an example of the present application.

Optionally, in another embodiment of the present application, as shown in FIG. 4, the present application further provides an apparatus for detecting a qualified rate of a battery electrode sheet, comprising:

a collection module 201 configured to collect a first weight corresponding to a to-be-detected electrode sheet;

a processing module 202 configured to dry the to-be-detected electrode sheet in a drying apparatus for a preset duration to collect a second weight corresponding to the dried to-be-detected electrode sheet; and a determination module 203 configured to determine a detection result of the to-be-detected electrode sheet based on a ratio of a drying difference to the second weight, where the drying difference is a difference between the first weight and the second weight.

The technical solutions of the examples of the present application are applied to compare a moisture value comprised in the electrode sheet obtained by drying with its dead weight, and determine a reasonable coating degree of each electrode sheet according to a weight ratio of the moisture value in each electrode sheet in a targeted manner, thereby avoiding a disadvantage of an abnormal moisture content of the electrode sheet caused by unreasonable coating in a process of coating the electrode sheet in a related art.

In another embodiment of the present application, the processing module 202 is configured to:

acquire a preset drying time association table; and select the preset duration matching the first weight based on the drying time association table; or determine the number of to-be-detected electrode sheets, and select the preset duration matching the number based on the drying time association table.

In another embodiment of the present application, the processing module 202 is configured to:

determine a material attribute of the to-be-detected electrode sheet, and select a preset ratio range matching the material attribute; and determine the detection result of the to-be-detected electrode sheet based on a size relationship between the ratio of the drying difference to the second weight and the preset ratio range.

In another embodiment of the present application, the processing module 202 is configured to:

determine historical storage information of the to-be-detected electrode sheet, wherein the historical storage information comprises a historical storage environment and a historical storage duration; and select the preset ratio range matching the material attribute based on the historical storage information.

In another embodiment of the present application, the processing module 202 is configured to:

determine that the detection result of the to-be-detected electrode sheet is qualified when detecting that the ratio of the drying difference to the second weight is within the preset ratio range; and determine that the detection result of the to-be-detected electrode sheet is unqualified when detecting that the ratio of the drying difference to the second weight is beyond the preset ratio range.

In another embodiment of the present application, the processing module 202 is configured to:

determine whether the first weight corresponding to the to-be-detected electrode sheet is within a preset weight range; and dry the to-be-detected electrode sheet in the drying apparatus for the preset duration when the first weight corresponding to the to-be-detected electrode sheet is within the preset weight range.

In another embodiment of the present application, the processing module 202 is configured to:

acquire an electrode sheet image corresponding to the to-be-detected electrode sheet, and input the electrode sheet image into an image detection model;

recognize a color feature and a brightness feature corresponding to the electrode sheet image using the image detection model; and dry the to-be-detected electrode sheet in the drying apparatus for the preset duration when detecting that the color feature and the brightness feature satisfy a preset condition.

Figure 5:
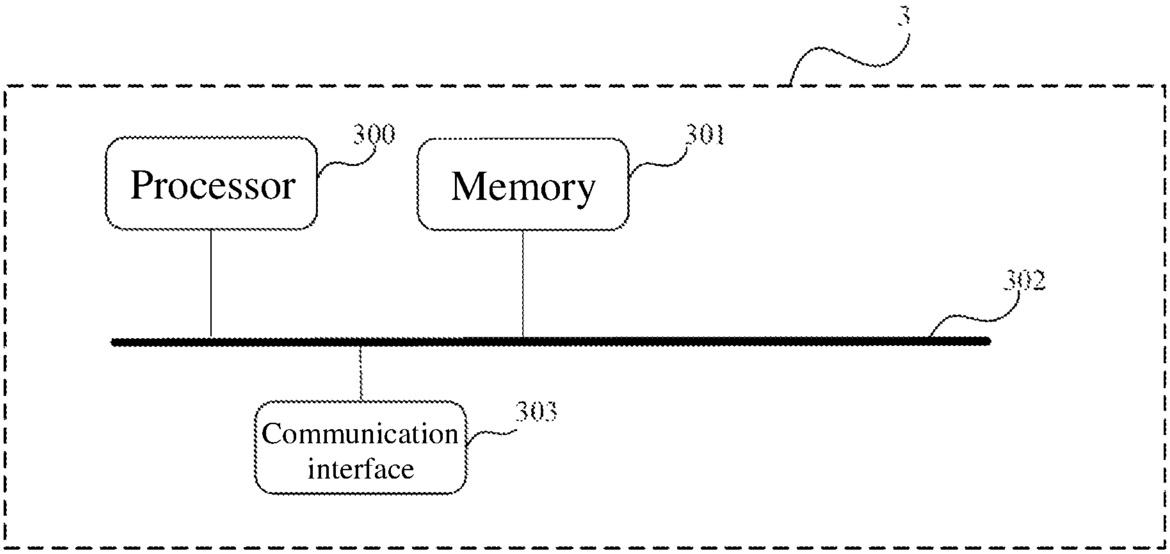
FIG. 5 is a schematic structural diagram of an electronic device provided in an example of the present application.

An embodiment of the present application further provides an electronic device, to execute the above method for detecting a qualified rate of a battery electrode sheet. Referring to FIG. 5, a schematic diagram of an electronic device provided in some embodiments of the present application is shown. As shown in FIG. 5, the electronic device 3 includes: a processor 300, a memory 301, a bus 302, and a communication interface 303, where the processor 300, the communication interface 303, and the memory 301 are connected through the bus 302; the memory 301 stores a computer program runnable on the processor 300, and the processor 300 executes, when running the computer program, the method for detecting a qualified rate of a battery electrode sheet provided in any one of the above embodiments of the present application.

The memory 301 may include a high-speed random access memory (RAM), and may further include a non-volatile memory, e.g., at least one disk memory. A communication connection between the apparatus network element and at least one other network element may be implemented through at least one communication interface 303 (either wired or wireless) using the Internet, a wide area network, a local network, a metropolitan area network, or the like.

The bus 302 may be an ISA bus, a PCI bus, an EISA bus, or the like. The bus may be divided into an address bus, a data bus, a control bus, etc. The memory 301 is configured to store a program, the processor 300 executes the program after receiving an execution instruction, and a method for data recognition disclosed in any one embodiment of the above examples of the present application may be applied to the processor 300 or implemented by the processor 300.

The processor 300 may be an integrated circuit chip with a signal processing capability. In an implementation process, steps of the above method may be completed by an integrated logic circuit of hardware in the processor 300 or instructions in the form of software. The above processor 300 may be a general-purpose processor, including a processor (Central Processing Unit, abbreviated as CPU), a network processor (abbreviated as NP), etc., or may be a digital signal processor (DSP), an application specific integrated circuit (ASIC), a field programmable gate array (FPGA) or other programmable logic devices, a discrete gate or transistor logic device, or a discrete hardware component, an. can implement or execute the methods, steps, and logical block diagrams disclosed in examples of the present application.

The general-purpose processor may be a microprocessor or the processor may also be any conventional processor or the like. The steps of the method disclosed in the examples of the present application may be directly embodied as being executed and completed by a hardware decoding processor, or being executed and completed by a combination of hardware and software modules in the decoding processor. The software module may be located in a mature storage medium in the art, such as a random access memory, a flash memory, a read-only memory, a programmable read-only memory or an electrically erasable programmable memory, or a register. The storage medium is located in the memory 301. The processor 300 reads information from the memory 301, and completes the steps of the above method in combination with its hardware.

The electronic device provided in the examples of the present application is derived from a same inventive concept as the method for detecting a qualified rate of a battery electrode sheet provided in the examples of the present application, and has same beneficial effects as the method adopted, operated, or implemented thereof.

Figure 6:
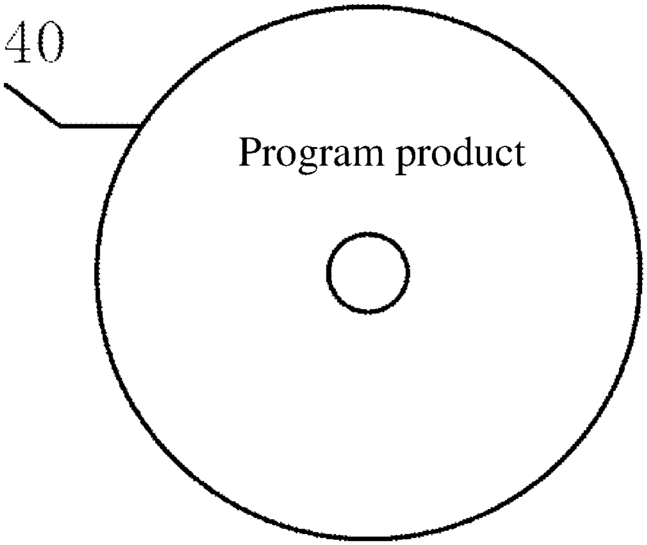
FIG. 6 is a schematic diagram of a storage medium provided in an example of the present application.

An embodiment of the present application further provides a computer-readable storage medium corresponding to the method for detecting a qualified rate of a battery electrode sheet provided in the above embodiments. Referring to FIG. 6, a computer-readable storage medium shown therein is an optical disk 40 storing a computer program (i.e., program product) thereon. When executed by a processor, the computer program, will implement the method for detecting a qualified rate of a battery electrode sheet provided in any one of the above embodiments.

It should be noted that examples of the computer-readable storage medium may further comprise, but are not limited to, a phase-change random-access memory (PRAM), a static random-access memory (SRAM), a dynamic random-access memory (DRAM), a random-access memory (RAM) of other type, a read-only memory (ROM), an electrically erasable programmable read-only memory (EEPROM), a flash RAM or other optical or magnetic storage mediums, which will not be detailed one by one here.

The computer-readable storage medium provided in the above examples of the present application is derived from a same inventive concept as the method for data recognition provided in the examples of the present application, and has same beneficial effects as the method adopted, operated, or implemented in an application stored therein.

It should be noted that:

in the specification provided here, many specific details are described. However, it can be understood that the examples of the present application may be practiced without these specific details. In some examples, well-known structures and techniques are not shown in detail, so as not to obscure understanding of the present specification.

Similarly, it should be understood that, in the above description of exemplary examples of the present application, various features of the present application are sometimes grouped together in a single example, figure, or description thereof, for the purpose of streamlining the present application and aiding in the understanding of one or more of various inventive aspects. However, the method of the disclosure should not be interpreted as reflecting an intention that the present claimed application claims more features than are explicitly recited in each claim. Rather, as the following claims reflect, inventive aspects are less than all features of a single example disclosed above. Thus, the claims following the Detailed Description are explicitly incorporated into the Detailed Description, with each claim standing on its own as a separate example of the present application.

Furthermore, while some examples described herein include some but not other features included in other examples, combinations of features of different examples are meant to be within the scope of the present application, and form different examples, as would be understood by those skilled in the art. For example, in the following claims, any one of the claimed examples can be used in any combination.

While the above description merely provides some embodiments of the present application, the scope of protection of the present application is not limited to the described embodiments. Any person skilled in the present technical field can easily conceive of variations or replacements within the technical scope disclosed in the present application. All variations or replacements should be encompassed within the scope of protection of the present application. Therefore, the scope of protection of the present application should be determined by the scope of protection of the appended claims.

What is claimed is:

1. A method for detecting a qualified rate of a battery electrode sheet, comprising:

collecting a first weight corresponding to a to-be-detected electrode sheet;

acquiring a preset drying time association table; and selecting a preset duration matching the first weight based on the drying time association table;

drying the to-be-detected electrode sheet in a drying apparatus for the preset duration and collecting a second weight corresponding to the dried to-be-detected electrode sheet; and determining a detection result of the to-be-detected electrode sheet based on a ratio of a drying difference to the second weight, wherein the drying difference is a difference between the first weight and the second weight.

2. The method according to claim 1, wherein:

the to-be-detected electrode sheet is one of one or more to-be-detected electrode sheets; and selecting the preset duration comprises determining a number of the one or more to-be-detected electrode sheets, and selecting the preset duration matching the number based on the drying time association table.

3. The method according to claim 1, wherein determining the detection result of the to-be-detected electrode sheet based on the ratio of the drying difference to the second weight comprises:

determining a material attribute of the to-be-detected electrode sheet, and selecting a preset ratio range matching the material attribute; and determining the detection result of the to-be-detected electrode sheet based on a size relationship between the ratio of the drying difference to the second weight and the preset ratio range.

4. The method according to claim 3, wherein determining the material attribute of the to-be-detected electrode sheet, and selecting the preset ratio range matching the material attribute comprise:

determining historical storage information of the to-be-detected electrode sheet, wherein the historical storage information comprises a historical storage environment and a historical storage duration; and selecting the preset ratio range matching the material attribute based on the historical storage information.

5. The method according to claim 4, further comprising, after selecting the preset ratio range matching the material attribute:

determining that the detection result of the to-be-detected electrode sheet is qualified in response to detecting that the ratio of the drying difference to the second weight is within the preset ratio range; and determining that the detection result of the to-be-detected electrode sheet is unqualified in response to detecting that the ratio of the drying difference to the second weight is beyond the preset ratio range.

6. The method according to claim 1, further comprising, after collecting the first weight corresponding to the to-be-detected electrode sheet:

determining whether the first weight corresponding to the to-be-detected electrode sheet is within a preset weight range;

wherein drying the to-be-detected electrode sheet in the drying apparatus for the preset duration comprises drying the to-be-detected electrode sheet in the drying apparatus for the preset duration in response to the first weight corresponding to the to-be-detected electrode sheet being within the preset weight range.

7. The method according to claim 1, further comprising, before collecting the first weight corresponding to the to-be-detected electrode sheet:

acquiring an electrode sheet image corresponding to the to-be-detected electrode sheet, and inputting the electrode sheet image into an image detection model; and recognizing a color feature and a brightness feature corresponding to the electrode sheet image using the image detection model;

wherein drying the to-be-detected electrode sheet in the drying apparatus for the preset duration comprises drying the to-be-detected electrode sheet in the drying apparatus for the preset duration in response to detecting that the color feature and the brightness feature satisfying a preset condition.

8. The method according to claim 1, further comprising, after determining the detection result of the to-be-detected electrode sheet based on the ratio of the drying difference to the second weight:

establishing a mapping relationship between the to-be-detected electrode sheet, the corresponding detection result, and a corresponding separator identifier, and storing the mapping relationship in a preset storage area; and receiving a collection instruction sent from a battery detection system, extracting the mapping relationship from the storage area, and sending the mapping relationship to the battery detection system.

9. An electronic device, comprising:

a memory storing executable instructions; and a processor configured to execute the executable instructions to implement the method according to claim 1.

10. A computer-readable storage medium, storing computer-readable instructions, wherein the instructions, when executed, implement the method according to claim 1.

11. A method for detecting a qualified rate of a battery electrode sheet, comprising:

collecting a first weight corresponding to a to-be-detected electrode sheet;

determining whether the first weight corresponding to the to-be-detected electrode sheet is within a preset weight range;

drying the to-be-detected electrode sheet in a drying apparatus for a preset duration in response to the first weight corresponding to the to-be-detected electrode sheet being within the preset weight range and collecting a second weight corresponding to the dried to-be-detected electrode sheet; and determining a detection result of the to-be-detected electrode sheet based on a ratio of a drying difference to the second weight, wherein the drying difference is a difference between the first weight and the second weight.

12. A method for detecting a qualified rate of a battery electrode sheet, comprising:

collecting a first weight corresponding to a to-be-detected electrode sheet;

drying the to-be-detected electrode sheet in a drying apparatus for a preset duration and collecting a second weight corresponding to the dried to-be-detected electrode sheet;

determining a detection result of the to-be-detected electrode sheet based on a ratio of a drying difference to the second weight, wherein the drying difference is a difference between the first weight and the second weight;

establishing a mapping relationship between the to-be-detected electrode sheet, the corresponding detection result, and a corresponding separator identifier, and storing the mapping relationship in a preset storage area; and receiving a collection instruction sent from a battery detection system, extracting the mapping relationship from the storage area, and sending the mapping relationship to the battery detection system.

* * * * *